Patented Sept. 2, 1952

2,609,391

UNITED STATES PATENT OFFICE 2,609,391

STABILIZATION OF PERACIDS WITH DIPICOLINIC ACID

Frank P. Greenspan, Buffalo, and Donald G. MacKellar, Kenmore, N. Y., assignors to Buffalo Electro-Chemical Company, Inc., Tonawanda, N. Y.

No Drawing. Application September 13, 1950, Serial No. 184,710

12 Claims. (Cl. 260—502)

This invention relates to the stabilization of aqueous solutions of peracids. It is particularly concerned with the stabilization of aqueous solutions of peracetic acid by the employment of dipicolinic acid as a stabilizer.

Peracetic acid and its salts are employed principally in dilute solution as bleaching, washing and germicidal baths. See article of Frank P. Greenspan and Donald C. MacKellar presented May 24, 1950 at the Tenth Annual Convention F. I. T., Chicago, Illinois. Baths for this purpose normally contain a low percentage of the active ingredient, the peracid, and such baths may be prepared from a peracid of higher concentration. Since concentrated peracetic acid is most effective and economically prepared from glacial acetic acid and high-strength hydrogen peroxide as, for instance, 90% $H_2O_2$, in the presence of about 1% sulfuric acid to catalyze the formation of peracetic acid, such high concentration products are diluted for such commercial uses. It will be understood, however, that peracetic acid may be prepared by the reaction between acetic acid, acetic anhydride and hydrogen peroxide of various strengths and in various ways, reference being made to U. S. Patent 2,490,800. It has been found generally desirable to increase the resistance of the peracids to decomposition, i. e., to stabilize them.

It is a principal object of the present invention to provide an effective stabilizer for peracetic acid of substantially any strength but particularly peracetic acid solutions containing substantial amounts of peracetic acid whereby the same may be prepared and stored in concentrations greater than about 10%, prior to dilution and subsequent use, although the invention is applicable to the stabilization of peracids of any strength.

It is also an object of the invention to provide stabilized solutions of peracetic acid resistant to decomposition at elevated temperatures, that is, temperatures of 25° C. and above.

The invention is applicable to the stabilization of the aliphatic peracids of which the lowest member is performic acid HCOOOH, the next succeeding homolog differing by the radical $CH_2$. The most important member of this series is peracetic acid and the invention will be generally described and its particular application exemplified with peracetic acid, $CH_3COOOH$. The peracids may be regarded as derived from the aliphatic acid by replacement of the hydroxyl group OH by the perhydroxyl group OOH.

As has been recognized by investigators in this field, the peracids differ very materially from peroxides and, stabilizers heretofore employed and recognized as stabilizers of hydrogen peroxide are not effective as stabilizers for peracetic acid. See Reichert et al. 2,347,434.

Therefore, the stabilization of aqueous solutions of a peracid is concerned not merely with arresting or retarding the breakdown into oxygen and the aliphatic acid; rather, the decomposition of aqueous solutions of the acids involves a relatively complicated series of the decomposition reactions, each of which yields a different decomposition product. Exemplifying such decomposition by the employment of peracetic acid, there appear to be several distinct mechanisms of decomposition and these appear to proceed principally in accordance with the following equations:

1. $CH_3COOOH + H_2O \rightarrow H_2O_2 + CH_3COOH$
2. $CH_3COOOH \rightarrow O + CH_3COOH$
3. $CH_3COOOH \rightarrow CH_4 + CO_2 +$ small quantity of other products The above reaction mechanisms appear to depend upon the temperature and the concentration of the peracetic acid as well as the pH of the solution undergoing decomposition. For instance, the gas being evolved from a carboy of 40% peracetic acid, at room temperature, when analyzed was found to contain the following:

| | Per cent |
|---|---|
| $CO_2$ | 24.0 |
| $O_2$ | 75.6 |
| CO | 0.0 |
| Remainder | 0.4 |

A sample of gas evolved from 1% peracetic acid at a pH 6.5 and at 80° C. was collected and analyzed with the following results:

| | Per cent |
|---|---|
| $CO_2$ | 3.2 |
| $O_2$ | 95.8 |
| CO | 0.0 |
| Remainder | 1.0 |

Whatever the mechanism of the decomposition may be, it is more greatly complicated than the simple decomposition of hydrogen peroxide into water and oxygen and, furthermore, it has been found that the usual stabilizers for hydrogen peroxide are not effective as stabilizers for the peracids. Thus, whereas sodium stannate is an excellent stabilizer for hydrogen peroxide, it is not particularly effective upon peracetic acid, for instance as shown by the following:

| Stabilizer | Concentration parts per mil. | Per Cent Active Oxygen Loss | |
|---|---|---|---|
| | | 15 Days | 29 Days |
| Sodium Stannate | 100 | 9.0 | 14.4 |
| | | 5.5 | 11.3 |

A sample of relatively concentrated peracetic acid was prepared from standard grade acetic acid and 90% hydrogen peroxide in the presence of 1% sulfuric acid. The resultant product contained 40% peracetic acid. To a sample of this peracetic acid was added 500 parts per million of dipicolinic acid. The samples so treated, as well as a similar sample of the original peracetic acid, not so treated, were stored at 30° C. in glass stoppered Pyrex flasks for one month whereupon the loss of the peracetic acid concentration was determined with the following results:

| Sample | Stabilizer | Per Cent Peracid Loss in one Month |
|---|---|---|
| 40% peracetic acid | None | 56.0 |
| 40% peracetic acid | Dipicolinic Acid 500 p. p. m. | 4.9 |
| 40% peracetic acid | Dipicolinic Acid 1,000 p. p. m. | 3.7 |

The amount of stabilizer to be employed may vary considerably and may be from about 5 parts per million to 1000 parts per million, depending upon the stability desired in the product and the concentration of peracid in the solution, with the average quantity required to stabilize being in the neighborhood of 250 to 750 parts per million of dipicolinic acid.

The dipicolinic acid may be added to the material subsequent to its formation or may be added to the ingredients prior to their reaction in the presence of the catalyst. No material difference in effectiveness of stabilization appears to result from the employment of these variations.

As stated, the dipicolinic acid appears to be effective as a stabilizer in substantially any dilution of the peracid. A sample of 40% peractic acid was diluted to 1% peracid and the pH of the solution adjusted to 7 by the addition of dilute chemically pure caustic soda solution. This solution was divided into a number of samples, and dipicolinic acid added. The samples were left at 80° C. and stabilities determined after a period of ½ hour. Those samples containing dipicolinic acid were much more resistant to decomposition than the blank containing no dipicolinic acid.

| | Amount of Dipicolinic Acid in Parts Per Million | Time In Hours | Per Cent Loss of Peracid |
|---|---|---|---|
| 1 | None | ½ | 71.9 |
| 2 | 100 | ½ | 61.1 |
| 3 | 500 | ½ | 44.1 |

In the presence of 1000 p. p. m. dipicolinic acid, the per cent loss in performic acid, at room temperature, was reduced from 43% in 24 hours, to 20% in 24 hours. Results of similar type are obtained with other peracids, for instance the aliphatic peracids, even if solid at normal temperature show increased stability by inclusion of dipicolinic acid. Perlauric acid unstabilized showed a loss at room temperature (20° C.) of 5.6% peracid per month. However, this loss was reduced by more than half when 500 parts per million dipicolinic acid was included as a stabilizer, namely, to 2.1% per month. Similar results are obtainable with perbenzoic acid, perphthalic acid, percamphoric acid and a host of others, including the substituted aliphatic peracids such as perchloracetic acid.

In general, the greater the amount of the dipicolinic acid added, the greater the stabilizing effect. This is shown by the results of the following test when a very unstable commercial sample of 41.5% peracetic acid was treated with various amounts of the stabilizer and the samples covered and stored at 30° C. The peracid loss was determined after two weeks:

| Samples Peracetic Acid Strength, Percent | Amount of Dipicolinic Acid in Parts per Million | Peracid Loss After Two Weeks In Percent |
|---|---|---|
| 1. 41.5 | None | 17.3 |
| 2. 41.5 | 10 | 11.6 |
| 3. 41.5 | 100 | 2.8 |
| 4. 41.5 | 1,000 | 1.0 |

A sample of 40% peracetic acid of somewhat better initial stability was treated with 250 parts per million of dipicolinic acid and stored in covered containers, and the peracid loss per month determined at four-week and eight-week intervals.

| Peracid 40% Peracetic Acid | Amount of Dipicolinic Acid in Parts per Million | Time Interval | Percent Peracid Loss Per Month |
|---|---|---|---|
| | | Weeks | |
| (1) Control | None | 4 | 8.1 |
| (2) Control | None | 8 | 8.4 |
| (3) Stabilized | 250 | 4 | 0.6 |
| (4) Stabilized | 250 | 8 | 1.4 |
| (5) Stabilized | 1,000 | 4 | 0.6 |
| (6) Stabilized | 1,000 | 8 | 0.9 |

Generally, the amount of dipicolinic acid employed will depend upon the initial instability of the peracid and the degree of stability desired in the final product, the greater the amount of stabilizer, the greater the stabilizing action. However, 250 to 500 parts per million of the stabilizer is usually sufficient in the average case. The following results were obtained in samples of 40% peracetic acid stored in covered containers at room temperature:

| Dipicolinic Acid in Parts Per Million | Percent Peracetic Loss Per Month |
|---|---|
| Control | 14.6 |
| 100 | 3.4 |
| 250 | 1.7 |
| 500 | 0.3 |
| 750 | 1.1 |
| 1,000 | 1.0 |

The dipicolinic acid also shows good stabilizing action under conditions where the sample of peracid is deliberately contaminated. Samples of 40% peracetic acid were exposed in uncovered containers placed on the desk top at room temperature for the exposure times noted. They were then transferred to clean glass stoppered flasks and stored at 30° C. The stability of these stored samples was then determined and is expressed in the following table as per cent loss per month. It will be seen that excellent resistance to decomposition was inherent in the stabilized samples:

|  | Exposure | Stability Percent Loss per Month |
|---|---|---|
|  | Hours |  |
| A—Unstabilized 40% Peracetic Acid | 0 | 0.9 |
|  | 1 | 11.9 |
|  | 4 | 17.0 |
|  | 24 | 20.0 |
| B—Peracetic Acid 40% Containing 250 p. p. m. Dipicolinic Acid | 0 | 0.6 |
|  | 1 | 0.6 |
|  | 4 | 1.7 |
|  | 24 | 2.3 |
| C—Peracid Acid 40% Containing 500 p. p. m. Dipicolinic Acid | 0 | 0 0 |
|  | 1 | 0.8 |
|  | 4 | 1.7 |
|  | 24 | 2.7 |

Dipicolinic acid is generally recommended as a stabilizer as the pure acid; however, the soluble salts such as the alkali metal salts, may also be employed to this end, as can certain double salts, such as the double salt with potassium nitrate. It is believed that in solution in the peracid dipicolinic acid itself is produced and functions as the stabilizer.

By means of the present invention, it is possible to obtain better stabilities in glass for the peracids generally, and a stability not obtainable with any known peroxygen stabilizer. It is further possible to employ standard grade chemicals in the preparation of the peracid and by addition of dipicolinic acid thereto, form a peracid of excellent stability and one which possesses a reserve stability against deliberate contamination.

From the practical view point, the invention will find wide applicability for the stabilization of peracetic acid as prepared from acetic acid and the commercial strength of hydrogen peroxide, i. e., aqueous solutions of peracetic acid from about 10% to 55% strength. It will be understood, however, that the invention is suitable for stabilizing peracetic acid and peracids generally of any strength.

What is claimed is:

1. The method of stabilizing a carboxylic peracid which comprises incorporating dipicolinic acid therein.

2. The method of stabilizing a carboxylic peracid which comprises incorporating at least 5 parts per million dipicolonic acid therein.

3. The method of stabilizing peracetic acid which comprises incorporating dipicolinic acid therein.

4. The method of stabilizing peracetic acid which comprises incorporating in stabilizing amounts dipicolinic acid therein.

5. The method of stabilizing peracetic acid which comprises incorporating at least 5 parts per million dipicolinic acid therein.

6. A stabilized carboxylic peracid containing the peracid and a small amount of dipicolinic acid as a stabilizer.

7. A stabilized carboxylic peracid containing the peracid and at least 5 parts per million of dipicolinic acid as a stabilizer.

8. A stabilized carboxylic peracid containing the peracid and from 250 to 750 parts per million of dipicolinic acid as a stabilizer.

9. A stabilized peracetic acid containing peracetic acid and a small amount of dipicolinic acid as a stabilizer.

10. A stabilized peracetic acid containing peracetic acid and at least 5 parts per million of dipicolinic acid as a stabilizer.

11. A stabilized peracetic acid containing peracetic acid and from 250 to 750 parts per million of dipicolinic acid as a stabilizer.

12. A stabilized peracetic acid solution containing from 10 to 55% peracetic acid and at least 5 parts per million of dipicolinic acid.

FRANK P. GREENSPAN.
DONALD G. MacKELLAR.

REFERENCES CITED

The following references are of record in the file of this patent:

UNITED STATES PATENTS

| Number | Name | Date |
|---|---|---|
| 2,363,778 | Pedersen | Nov. 28, 1944 |